United States Patent
Sun et al.

(10) Patent No.: US 11,301,638 B2
(45) Date of Patent: Apr. 12, 2022

(54) HOLISTIC KNOWLEDGE REPRESENTATION FOR SEMANTIC MODELING OF STRUCTURED DATA

(71) Applicant: International Business Machines Corporation, New York, NY (US)

(72) Inventors: Changying Sun, Ottawa (CA); Lin Luo, Ottawa (CA); Graham Wills, Naperville, IL (US)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 16/659,026

(22) Filed: Oct. 21, 2019

(65) Prior Publication Data
US 2021/0117510 A1  Apr. 22, 2021

(51) Int. Cl.
*G06F 16/31* (2019.01)
*G06F 40/30* (2020.01)
*G06F 16/242* (2019.01)
*G06F 40/284* (2020.01)

(52) U.S. Cl.
CPC ............ *G06F 40/30* (2020.01); *G06F 16/243* (2019.01); *G06F 40/284* (2020.01)

(58) Field of Classification Search
CPC ...... G06F 40/30; G06F 40/284; G06F 16/367; G06F 40/211; G06F 40/268; G06F 16/3344; G06F 40/205; G06F 16/9024; G06F 8/427; G06F 8/436
See application file for complete search history.

(56) References Cited

U.S. PATENT DOCUMENTS

| | | | |
|---|---|---|---|
| 6,199,034 B1 * | 3/2001 | Wical | G06F 40/30 704/9 |
| 7,627,588 B1 | 12/2009 | Mohan et al. | |
| 7,702,647 B2 | 4/2010 | Uceda-Sosa | |
| 8,429,179 B1 * | 4/2013 | Mirhaji | G06F 40/284 707/756 |
| 10,002,126 B2 | 6/2018 | Grosset et al. | |
| 10,698,924 B2 * | 6/2020 | Rais-Ghasem | G06F 16/367 |
| 11,074,411 B2 * | 7/2021 | Sun | G06F 40/263 |
| 2011/0270866 A1 * | 11/2011 | Dettinger | G06Q 10/067 707/769 |

(Continued)

OTHER PUBLICATIONS

Grainger, "The Semantic Knowledge Graph: A Compact, Auto-Generated Model of Real-Time Traversal and Ranking of Any Relationship within a Domain", 2016, 2016 IEEE International Conference on Data Science and Advanced Analytics, pp. 420-429.

(Continued)

*Primary Examiner* — Olujimi A Adesanya
(74) *Attorney, Agent, or Firm* — Yee & Associates, P.C.

(57) ABSTRACT

A computer-implemented method, system, and computer program product for generating a semantic model of data comprising a plurality of data items. Semantic concepts are identified for each data item in the plurality of data items. Data concepts are identified for each data item in the plurality of data items based on data characteristics of the data item and using a data ontology that defines the data concepts that are used to represent the data characteristics. The semantic model of the data is generated using the semantic concepts and the data concepts identified for the plurality of data items.

9 Claims, 9 Drawing Sheets

(56) References Cited

U.S. PATENT DOCUMENTS

| | | | |
|---|---|---|---|
| 2014/0074771 A1* | 3/2014 | He | G06F 16/283 |
| | | | 707/602 |
| 2014/0279677 A1* | 9/2014 | Grosset | G06Q 10/067 |
| | | | 705/348 |
| 2015/0006160 A1 | 1/2015 | Grosset et al. | |
| 2015/0006432 A1* | 1/2015 | Grosset | G06Q 10/067 |
| | | | 705/348 |
| 2015/0186776 A1* | 7/2015 | Petitclerc | G06Q 10/0637 |
| | | | 706/45 |
| 2015/0186808 A1 | 7/2015 | Petitclerc et al. | |
| 2015/0378984 A1* | 12/2015 | Ateya | G06F 16/3344 |
| | | | 707/769 |
| 2016/0350283 A1* | 12/2016 | Carus | G06F 40/30 |
| 2021/0117505 A1* | 4/2021 | Sun | G06F 40/263 |

OTHER PUBLICATIONS

IBM Watson Knowledge Catalog, "Unlock the power of AI with IBM Watson," IBM United Kingdom Limited, accessed Oct. 21, 2019, 5 pages, www.ibm.com/uk-en/cloud/watson-knowledge-catalog.

* cited by examiner

| RANK | STATE | LOCID | AIRPORT NAME | SOURCE | 2010 LANDED WEIGHT (LBS.) | 2009 LANDED WEIGHT (LBS.) | % CHANGE |
|---|---|---|---|---|---|---|---|
| 1 | TN | MEM | MEMPHIS INTERNATIONAL | MEMPHIS | 19,544,635,833 | 18,928,729,202 | 3.25% |
| 2 | AK | ANC | TED STEVENS ANCHORAGE INTERNATIONAL | ANCHORAGE | 19,463,543,790 | 15,524,360,013 | 25.37% |
| 3 | KY | SDF | LOUISVILLE INTERNATIONAL-STANDIFORD | LOUISVILLE | 10,637,700,120 | 10,278,035,711 | 3.50% |
| 4 | FL | MIA | MIAMI INTERNATIONAL | MIAMI | 6,905,291,871 | 6,352,786,009 | 8.70% |
| 5 | IL | ORD | CHICAGO O'HARE INTERNATIONAL | CHICAGO | 4,895,940,100 | 3,499,701,350 | 39.90% |
| 6 | IN | IND | INDIANAPOLIS INTERNATIONAL | INDIANAPOLIS | 4,717,483,735 | 4,575,418,342 | 3.10% |
| 7 | CA | LAX | LOS ANGELES INTERNATIONAL | LOS ANGELES | 3,954,810,091 | 3,768,864,700 | 4.93% |
| 8 | NY | JFK | JOHN F KENNEDY INTERNATIONAL | NEW YORK | 3,899,848,051 | 3,181,559,852 | 22.58% |
| 9 | TX | DFW | DALLAS/FORT WORTH INTERNATIONAL | FORT WORTH | 3,031,597,346 | 2,872,971,976 | 5.52% |
| 124 | CA | SCK | STOCKTON METROPOLITAN | STOCKTON | 81,977 | 0 | |
| 9999 | MO | MKC | CHARLES B WHEELER DOWNTOWN | KANSAS CITY | 0 | 2,125,608 | -100.00% |

HOLISTIC KNOWLEDGE REPRESENTATION FOR SEMANTIC MODELING OF STRUCTURED DATA

BACKGROUND

1. Field

The disclosure relates generally to modeling data for business intelligence and other applications. More particularly, illustrative embodiments relate to a computer implemented method, a system, and a computer program product for generating a semantic model of data using both semantic concepts in the data and characteristics of the data.

2. Description of the Related Art

Business enterprises and other organizations generate large amounts of data every day. This data may range from fully structured enterprise data sources, such as databases or multidimensional data cubes, to semi-structured sources, such as comma-separated values, CSV, files or electronic spreadsheets. To help improve business performance and drive competitive advantage, users expect that artificial intelligence and analytics systems are able to understand the data, quickly find hidden patterns in the data, discover insights to help them make informed decisions faster, or recommend solutions to help them solve complex problems.

An important building block to achieve these goals and satisfy the needs of enterprise customers is to understand the semantic meaning of their data, discover underlying relationships among these data, and capture the knowledge discovered from the data in a conceptual or semantic model that represents the business interpretation of the data. A semantic model should be able to describe the structure of the data, semantic meanings and data characteristics of each data item, relationships between data items, groups and hierarchies among data items, and more.

Therefore, it would be desirable to have a method and apparatus that take into account at least some of the issues discussed above, as well as other possible issues. For example, it would be desirable to have a method and apparatus that overcome technical problems with generating a semantic model of data.

SUMMARY

According to illustrative embodiments, a computer-implemented method of generating a semantic model of data comprising a plurality of data items is provided. For each data item in the plurality of data items, a data processing system identifies semantic concepts for the data item. For each data item in the plurality of data items, the data processing system identifies data concepts for the data item based on data characteristics of the data item and using a data ontology that defines the data concepts that are used to represent the data characteristics. The semantic model of the data is generated by the data processing system using the semantic concepts and the data concepts identified for the plurality of data items.

According to illustrative embodiments, a system for generating a semantic model of data comprising a plurality of data items is provided. The system comprises a data processing system that is configured to identify semantic concepts for each data item in the plurality of data items and to identify data concepts for each data item in the plurality of data items based on data characteristics of the data item and using a data ontology that defines the data concepts that are used to represent the data characteristics. The data processing system is configured to generate the semantic model of the data using the semantic concepts and the data concepts identified for the plurality of data items.

According to illustrative embodiments, a computer program product for generating a semantic model of data comprising a plurality of data items is provided. The computer program product comprises a computer readable storage medium having program instructions embodied therewith. The program instructions are executable by a device to cause the device to identify semantic concepts for each data item in the plurality of data items, identify data concepts for each data item in the plurality of data items based on data characteristics of the data item and using a data ontology that defines the data concepts that are used to represent the data characteristics, and generate the semantic model of the data using the semantic concepts and the data concepts identified for the plurality of data items.

Other variations are possible, as described below.

DETAILED DESCRIPTION

The illustrative embodiments recognize and take into account that, traditionally, an artificial intelligence and analytics system may require a data modeler to describe data manually. Such a manual solution is time consuming and requires intensive training to the data modelers.

In recent years, artificial intelligence and analytics tools and systems have used different approaches to automatically generate semantic models to serve the demands of users. Lack of accuracy in semantic models that describe the semantic meaning of customer data may result in irrelevant or wrong recommendations and significantly damage credibility and trust that can foster user dissatisfaction or abandonment of analytic systems.

Illustrative embodiments also recognize and take into account that analytic systems and tools can use the knowledge captured in a semantic model to make various recommendations. For example, a visualization recommender may recommend a time-based data visualization, such as a trend analysis chart, for time related data items, or may recommend a geography-based data visualization, such as a map, for geography related data items.

However, some visualizations are only suitable for certain data characteristics. For example, a box plot chart is best to visualize data with outliers. A bar chart is not a good choice to visualize a field with too many categories. Radar charts are preferred to visualize seasonal or cyclical data. Moreover, the same concept in different contexts may be visualized differently. For example, "Hourly Rate" and "Error Rate" may both be tagged with business concept "Ranking". When a user asks "average hourly rate by job role", "Ranking" is treated as a measure and can be aggregated; on the other hand, when a user asks "compare response time by error rate", "Ranking" is used as a categorical field in a bar chart. Hence, besides their semantic meanings, data fields have some common natures that are independent from semantic meanings but drive recommendations. These common natures are the data knowledge and should be described in a semantic model.

Choice of visualization is only one of many decisions that an analytic application may take to automate actions that assist a user in uncovering value in their structured data. Other examples include: appropriate choice of predictive model, fields related to a target field, dashboard content and layout, data transformations and calculations, and able relationships and related data searches.

Current artificial intelligence and analytics tools and systems use various different approaches to automatically generate semantic models to serve the fast growing demands of enterprise users. But those semantic models generated by current systems and methods can only partially describe the data using domain concepts, such "Revenue" or "Age". Such currently generated semantic models may not include knowledge representation of the hidden pattern in the data, such as, whether the data is cyclical or has outlier or is continuous or is ordered. For example, some current systems and methods construct a one-sided model with business ontology. The knowledge captured by such a semantic model may be inaccurate and insufficient and may resulted in irrelevant or wrong recommendations and that may damage credibility and trust, which can foster user dissatisfaction.

Illustrative embodiments provide a method and apparatus for automatically constructing a semantic model using a holistic approach by representing the knowledge discovered from the data not only with more accurate domain concepts but also with a rich set of data concepts that represent data characteristics using ontological methods independently from domain concepts.

Figure 1:
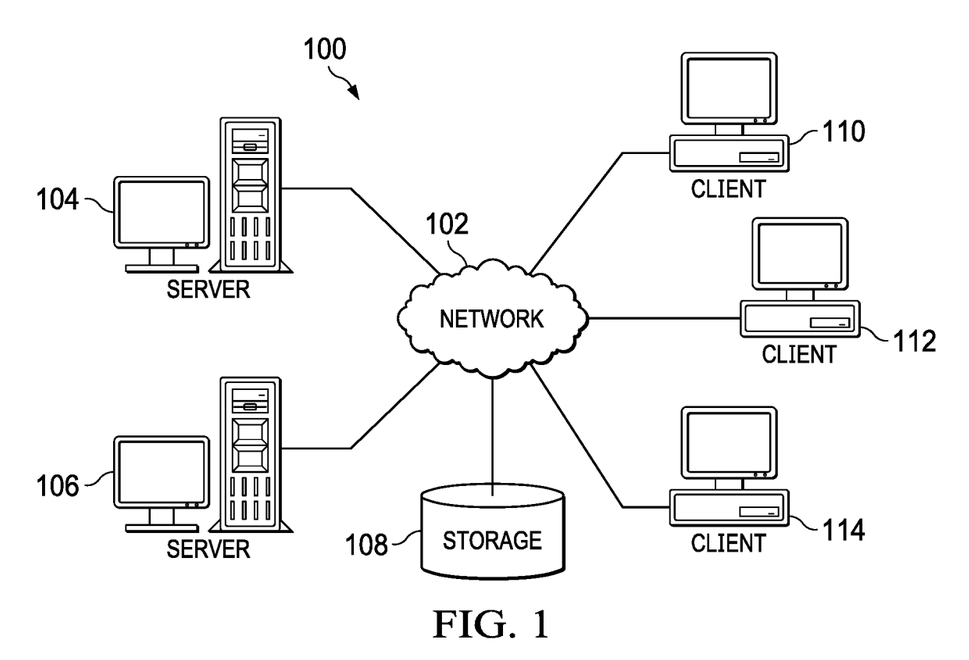
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computer 110, client computer 112, and client computer 114 connect to network 102. Client computers 110, 112, and 114 can be, for example, computers, workstations, or network computers. In the depicted example, server computer 104 provides information, such as boot files, operating system images, and applications to client computers 110, 112, and 114. In this illustrative example, server computer 104, server computer 106, storage unit 108, and client computers 110, 112, and 114 are network devices that connect to network 102 in which network 102 is the communications media for these network devices.

Client computers 110, 112, and 114 are clients to server computer 104 in this example. Network data processing system 100 may include additional server computers, client computers, and other devices not shown. Client computers 110, 112, and 114 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client computers 110, 112, or 114 over network 102 for use on client devices 110, 112, or 114.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

The phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
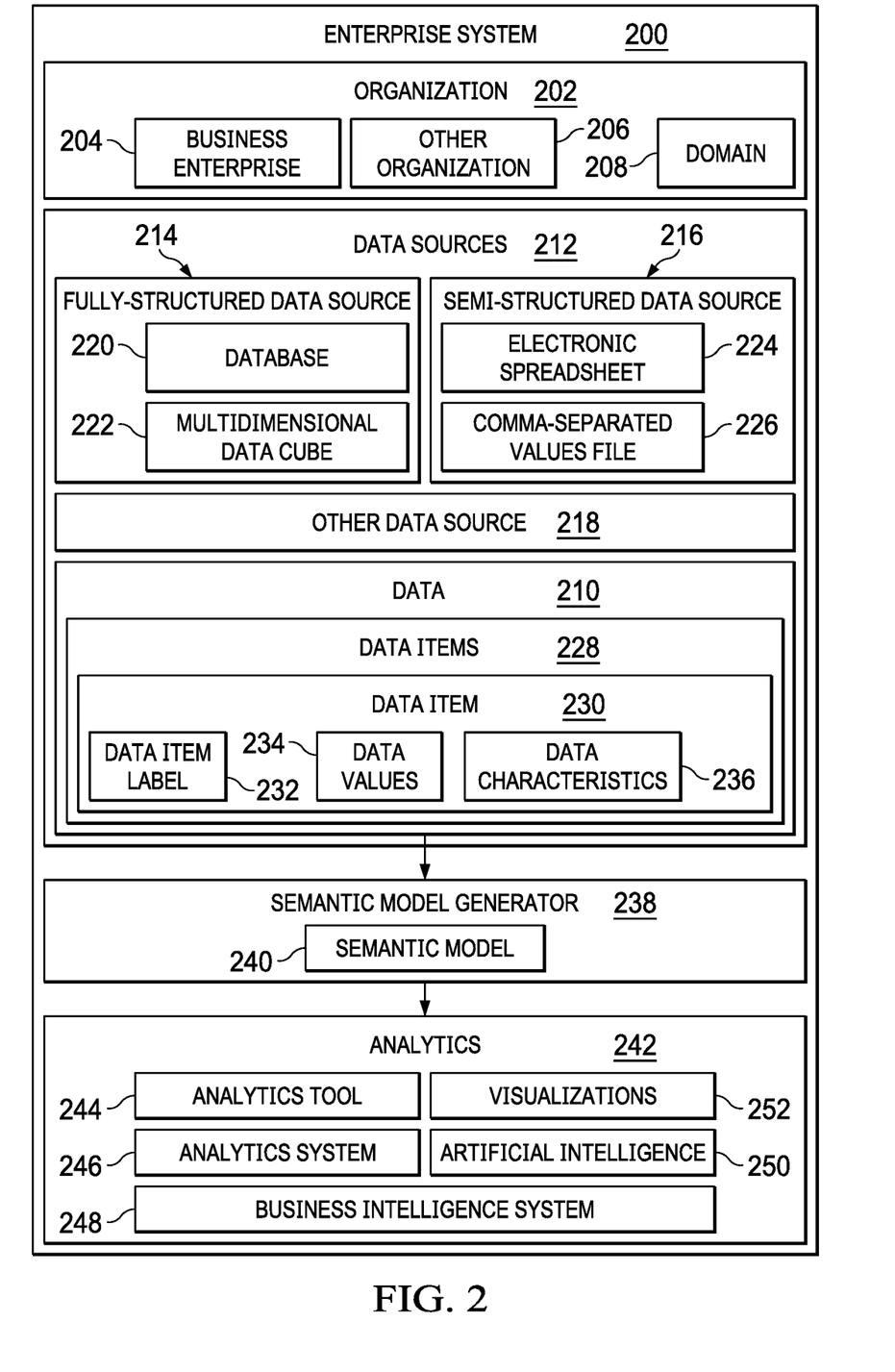
FIG. 2 is a block diagram of an enterprise system including a semantic model generator in accordance with an illustrative embodiment.

With reference to FIG. 2, a block diagram of an enterprise system including a semantic model generator is depicted in accordance with an illustrative embodiment. In this illustrative example, enterprise system 200 includes components that may be implemented in hardware such as the hardware shown in network data processing system 100 in FIG. 1.

Enterprise system 200 may be implemented in software, hardware, firmware or a combination thereof. When software is used, the operations performed by enterprise system 200 may be implemented in program code configured to run on hardware, such as a processor unit. When firmware is used, the operations performed by enterprise system 200 may be implemented in program code and data and stored in persistent memory to run on a processor unit. When hardware is employed, the hardware may include circuits that operate to perform the operations in enterprise system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Enterprise system 200 may be operated by or for any appropriate organization 202. For example, without limitation, organization 202 may be business enterprise 204 or other organization 206. Organization 202 may perform business or other appropriate operations in domain 208.

During operations, and otherwise, enterprise system 200 may generate data 210 from various data sources 212. For example, without limitation, data sources 212 may include fully-structured data source 214, semi-structured data source 216, other data source 218, or any other appropriate combination of data sources. Examples of fully-structured data source 214 may include database 220 and multidimensional data cube 222. Examples of semi-structured data source 216 may include electronic spreadsheet 224 and comma-separated values, CSV, file 226.

Data 212 may comprise a plurality of data items 228. Each data item 230 in plurality of data items 228 may comprise data item label 232 and data values 234. Data item label 232 may comprise alphanumeric text, such as a word, phrase, abbreviation of a word or a phrase, code, or symbol which describes what data values 234 of data item 230 refer to. Data values 234 in data item 230 may have various data characteristics 236. Data characteristics 236 may comprise any appropriate characteristic of data values 234 in data item 230.

Enterprise system 200 may include semantic model generator 238. In accordance with an illustrative embodiment, semantic model generator 238 is configured to automatically generate semantic model 240 of data 210 using a holistic approach by representing the knowledge discovered from data 210 not only with more accurate semantic concepts in domain 208 of data 210 but also with a set of data concepts that represent data characteristics using ontological methods independently from semantic concepts that are tied to a particular domain 208. Alternatively, some or all of the functions performed by semantic model generator 238 may be performed outside of enterprise system 200 with resulting semantic model 240 provided to enterprise system 200 for use by organization 202.

Enterprise system 200 may use semantic model 240 of data 210 to perform analytics 242. Analytics 242 may include the discovery, interpretation, and communication of meaningful patterns in data 210 and the process of applying those patterns towards effective decision making. For example, without limitation, organization 202 may apply analytics to data 210 using semantic model 240 to describe, diagnose, predict, and improve business performance. Semantic model 240 may be used to perform any appropriate analytics 242.

Analytics 242 may be performed using any appropriate analytics tool 244 or analytics system 246. Analytics tool 244 or analytics system 246 may be implemented as part of enterprise system 200. Alternatively, some or all of the functions performed by analytics tool 244 or analytics system 246 may be performed outside of enterprise system 200 with the results of analytics 242 provided to enterprise system 200 for use by organization 202.

For example, without limitation, analytics system 246 may comprise business intelligence system 248. Business intelligence system 248 may be configured to perform analytics 242 using semantic model 240 of data 210 to improve business performance of business enterprise 204 or other organization 206. Analytics tool 244 and analytics system 246 may use artificial intelligence 250 to perform analytics 242. For example, analytics 242 may include generating visualizations 252 of data 210 using semantic model 240 of data 210. Visualizations 252 may include the graphic representation of data 210 including images that communicate relationships among the represented data to viewers of the images.

The illustration of enterprise system 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
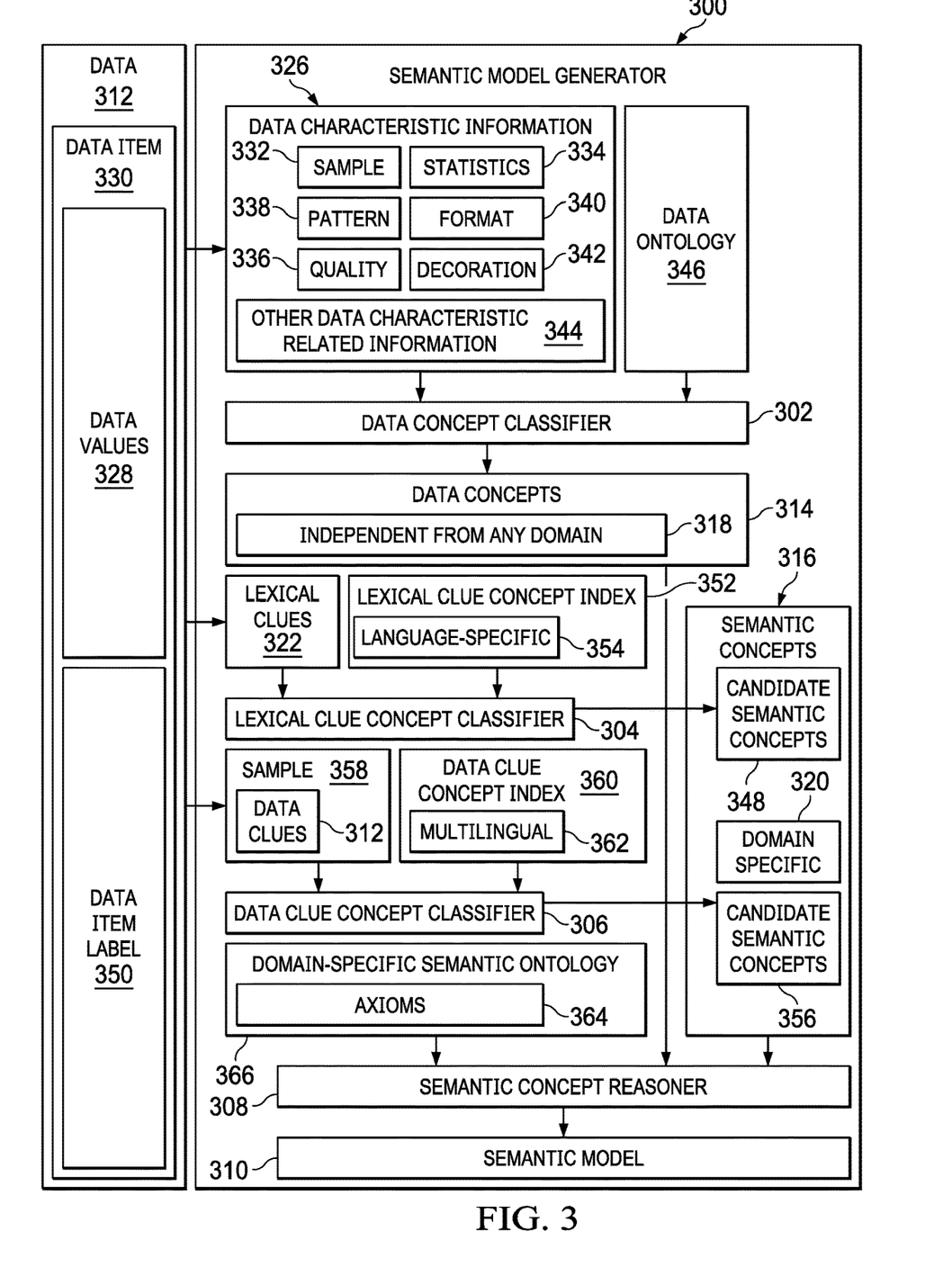
FIG. 3 is a block diagram of a semantic model generator in accordance with an illustrative embodiment.

With reference to FIG. 3, a block diagram of a semantic model generator is depicted in accordance with an illustrative embodiment. Semantic model generator 300 is an example of one implementation of semantic model generator 238 in enterprise system 200 in FIG. 2. Semantic model generator 300 may comprise data concept classifier 302, lexical clue concept classifier 304, data clue concept classifier 306, and semantic concept reasoner 308.

In accordance with an illustrative embodiment, semantic model generator 300 is configured to generate semantic model 310 of data 312 using both data concepts 314 and semantic concepts 316. Data concepts 314 represent the data characteristics of data 312 and are independent from any domain 318. In accordance with an illustrative embodiment, semantic concepts 316 are domain-specific 320 and include concepts that are identified from lexical clues 322 in data item labels in data 312 and concepts that are identified from data clues 324 in the data values in data 312.

Semantic model generator 300 may be configured to provide data characteristic information 326 to data concept classifier 302. Data characteristic information 326 may include any information that indicates one or more characteristics of data values 328 in data item 330 in data 312. For example, without limitation, data characteristic information 326 may include one or more of sample 332 of data values 328, statistics 334 of data values 328, quality 336 of data values 328, pattern 338 of data values 328, format 340 of data values 328, decoration 342 of data values 328, and other data characteristic related information 344. Semantic model generator 300 may be configured to generate data characteristic information 326 for data item 330 by analyzing data values 328 of data item 330 to identify data characteristics of data item 330.

Figure 4:
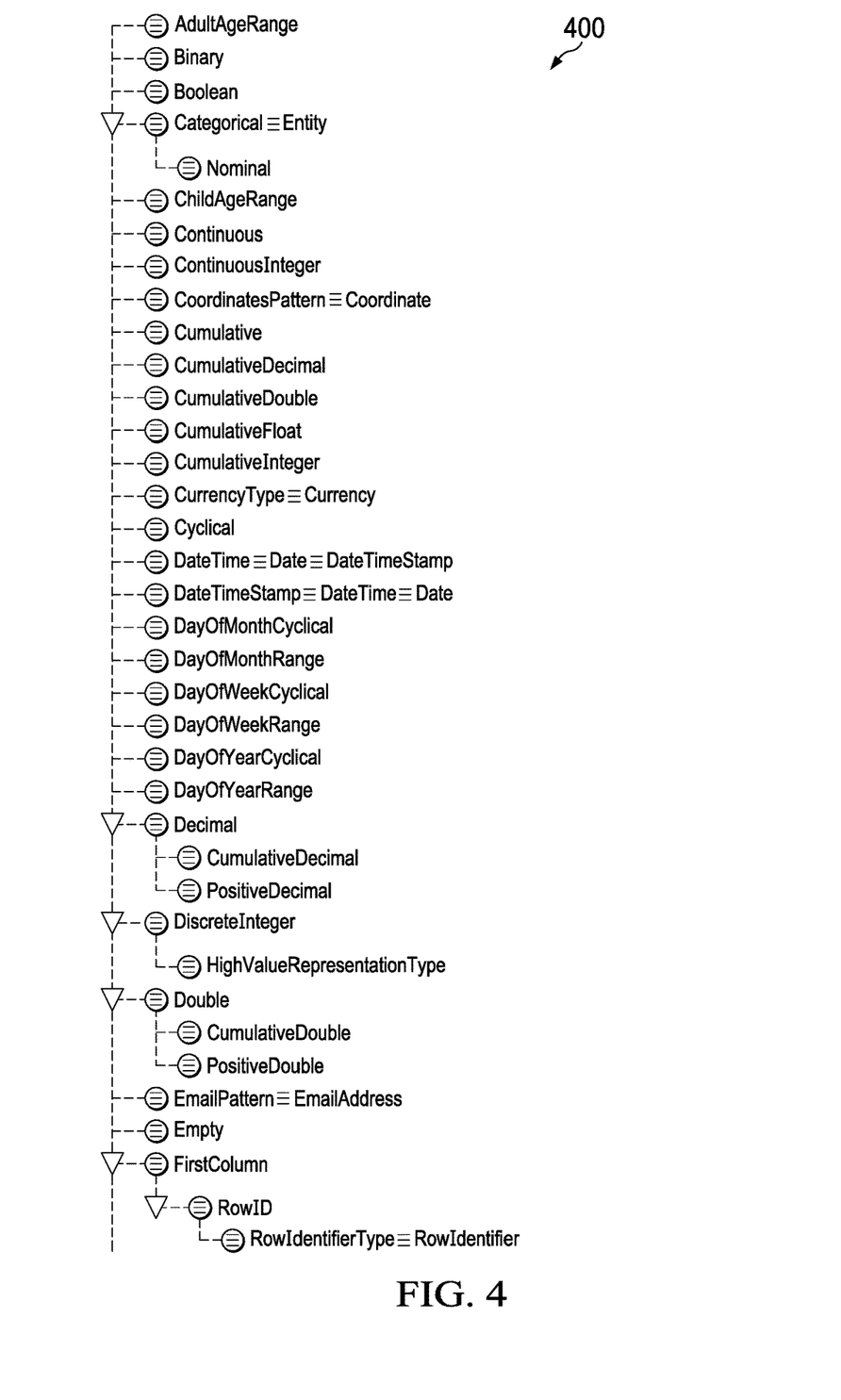
FIG. 4 is an illustration of data concepts in accordance with an illustrative embodiment.

For each data item 330, data concept classifier 302 is configured to evaluate data characteristic information 326 using axioms or rules defined in data ontology 346 to identify data concepts 314 which represent the data characteristics of data item 330. Data ontology 346 may be prepared as part of a knowledge base preparation process before data ontology 346 is used to identify data concepts 314 in data 312. Data ontology 346 may define data concepts specifically used to represent data characteristics. Examples of data concepts 314 may include, without limitation, "Cumulative", "Cyclical", "Ordered", "Uniform", or any other appropriate concept, or combination of concepts, representing characteristics of data. Further examples of data concepts 314 are shown in FIG. 4.

Data concepts 314 are independent from any domain 318 semantic concepts. Data concepts 314 can describe data characteristics in a normalized way. Data concepts 314 may be used directly in an analytics tool or system to recommend a visualization of data 312 or make another recommendation. Data concepts 314 may be used as features to train machine learning models.

Lexical clue concept classifier 304 is configured to identify candidate semantic concepts 348 for data item 330 using lexical clues 322. Candidate semantic concepts 348 may be referred to as first candidate semantic concepts or lexical clue semantic concepts. Semantic model generator 300 may provide data item label 350 from data item 330 to lexical clue concept classifier 304 to provide lexical clues 322 to lexical clue concept classifier 304. Lexical clue concept classifier 304 may be configured to identify candidate semantic concepts 348 for data item 330 in any appropriate manner. For example, without limitation, lexical clue concept classifier 304 may be configured to use lexical clue concept index 352 to identify candidate semantic concepts 348 for data item 330 from lexical clues 322. Lexical clue concept index 352 may be language-specific 354.

For example, without limitation, lexical clue concept classifier 304 may be configured to analyze lexical clues 322 in data item label 350 using a natural language processing tool to obtain enhanced lexical information for data item 330. Lexical clue concept classifier 304 may then build a query using the enhanced lexical information of data item label 350 to search lexical clue concept index 352 or multiple language-specific 354 lexical clue concept indexes based on the language or multiple languages detected or specified for data 312. For each clue concept record in the search result, lexical clue concept classifier 304 may compute a new weighted relevance score by factoring a boosted search relevance score with a weight calculated by a scoring algorithm. Candidate semantic concepts 348 then may be selected from top ranked clue concept records. This example method of identifying candidate semantic concepts 348 for data item 330 using lexical clues 322 is described in more detail in U.S. patent application Ser. No., filed on even date herewith, and titled "Disambiguation of Concept Classifications Using Language-Specific Rules", which is incorporated by reference herein in its entirety.

Data clue concept classifier 306 is configured to identify candidate semantic concepts 356 for data item 330 using data clues 312. Candidate semantic concepts 356 may be referred to as second candidate semantic concepts. Semantic model generator 300 may provide sample 358 of data values 328 from data item 330 to data clue concept classifier 306 as data clues 312. Data clue concept classifier 306 may be configured to identify candidate semantic concepts 356 for data item 330 in any appropriate manner. For example, without limitation, data clue concept classifier 306 may be configured to use data clue concept index 360 to identify candidate semantic concepts 356 for data item 330 from data clues 312. Data clue concept index 360 may be multilingual 362. In other words, data clue concept index 360 may not be limited to any single or multiple particular languages.

For example, without limitation, data clue concept classifier 306 may be configured to build a search query using sample 358 of data values 328 to search data clue concept index 360. From the search results, data clue concept classifier 306 may count occurrences of each concept and compute the ratio of matches. Data clue concept classifier 306 then may select candidate semantic concepts 356 from concepts for which the ratio exceeds a certain threshold. For example, data item 312 with data item label 350 "Source" may include many unique data values 328 that are city names. In this case, data clue concept classifier 306 may elect "City" as one of candidate semantic concepts 356.

Semantic concept reasoner 308 is configured to produce semantic model 310 by evaluating data concepts 314, candidate semantic concepts 348, and candidate semantic concepts 356, based on axioms 364 defined in domain-specific semantic ontology 366. Data concepts 314 may be defined in axioms 364 as one of the conditions.

In accordance with an illustrative embodiment, semantic concepts 316 may be classified solely based on data concepts 314. For example, for data item 330 with data item label 350 "nowhere", when the data concept "CoordinatesPattern" is classified, data item 330 may be classified with semantic concept "Coordinate".

Some of candidate semantic concepts 348, 358 may be removed and not included in semantic model 310 if semantic concept reasoner 308 identifies a violation of one or more axioms 364 defined in semantic ontology 366. For example, semantic concept "Date" may require that data must be tagged with "DateTime" or "DateTimeStamp" data concept. In this case, if data item 330 is not tagged with these data concepts 314, data item 330 will not be classified as "Date", even if data item label 350 for data item 330 is "Date".

Various knowledge discoveries may be performed using semantic model 310. As in semantic concept ontologies, relationships may be defined between classes or properties. Therefore, with richer and more accurate concepts being tagged to data items, deeper and more accurate relationships may be discovered between data items in semantic model 310. Based on richer and more accurate concepts and relationships being discovered, more and better groups among data items may be discovered based on different grouping types and form more accurate hierarchies among certain data items. Therefore, more knowledge may be discovered and described in semantic model 310 generated in accordance with an illustrative embodiment.

With reference to FIG. 4, an illustration of data concepts is depicted in accordance with an illustrative embodiment. Data concepts 400 are examples, without limitation, of data concepts 314 in semantic model generator 300 in FIG. 3.

Figure 5:
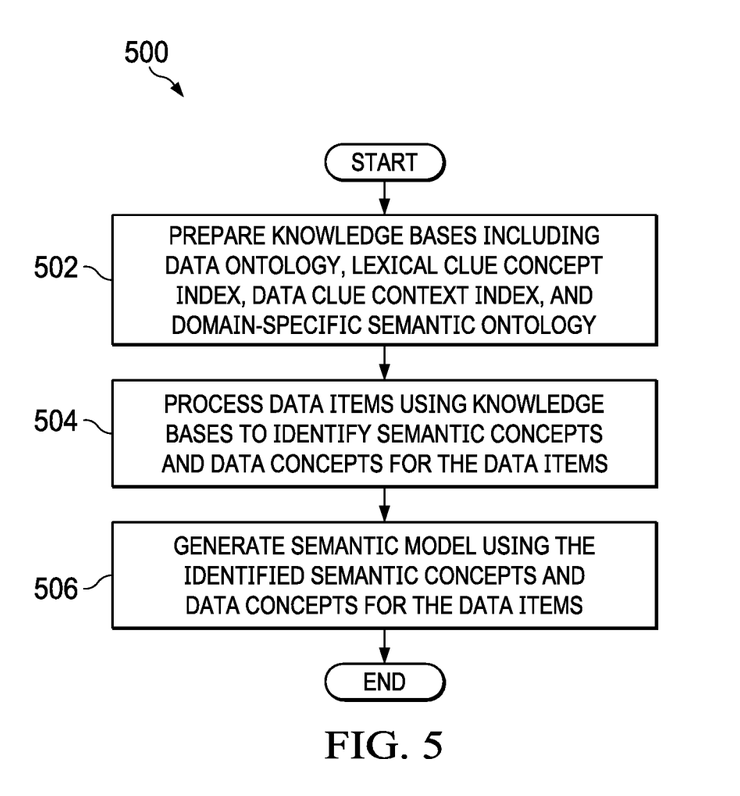
FIG. 5 is an illustration of a flowchart of a process for generating a semantic model of data in accordance with an illustrative embodiment.

With reference to FIG. 5, an illustration of a flowchart of a process for generating a semantic model of data is depicted in accordance with an illustrative embodiment. Process 500 may be implemented in hardware, software, or both. When implemented in software, the process may take the form of program code that is run by one or more processor units located in one or more hardware devices in one or more computer systems. Process 500 may be implemented, for example, in enterprise system 200 in FIG. 2.

Process 500 may begin with preparing knowledge bases, including a data ontology, a lexical clue concept index, a data clue context index, and a domain-specific semantic ontology (operation 502). Data items then may be processed using the knowledge bases to identify semantic concepts and data concepts for the data items (operation 504). The semantic concepts may be domain-specific whereas the data concepts may be independent from any domain. A semantic model then may be generated using the identified semantic concepts and data concepts for the data items (operation 506), with the process terminating thereafter.

Figure 6:
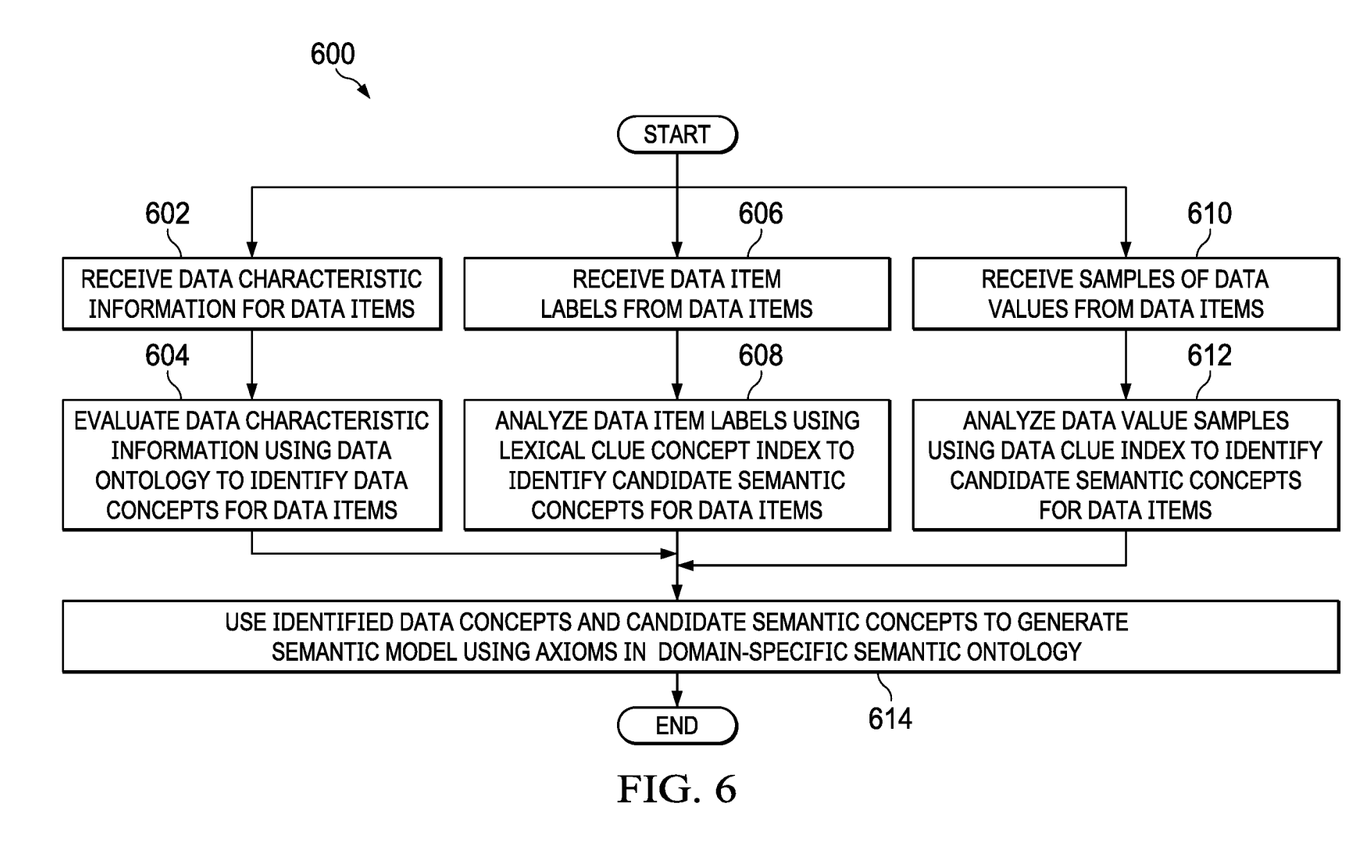
FIG. 6 is an illustration of a flowchart of a more detailed process for generating a semantic model of data in accordance with an illustrative embodiment.

Turning to FIG. 6, an illustration of a flowchart of a more detailed process for generating a semantic model is depicted in accordance with an illustrative embodiment. Process 600 may be implemented, for example, in semantic model generator 300 in FIG. 3. Process 600 is an example of one implementation of operations 504 and 506 in process 500 in FIG. 5.

Process 600 may include receiving data characteristic information for data items (operation 602) and evaluating the data characteristic information using a data ontology to identify data concepts for the data items (operation 604). Process 600 also may include receiving data item labels for data items (operation 606) and analyzing the data item labels using a lexical clue concept index to identify first candidate semantic concepts for the data items (operation 608). Process 600 also may include receiving samples of data values from data items (operation 610) and analyzing the data value samples using a data clue concept index to identify second candidate semantic concepts for the data items (operation 612). Note that operations 602 and 604 may be performed in parallel with operations 606 and 608 and operations 610 and 612 in process 600. The identified data concepts and candidate semantic concepts then maybe used to generate a semantic model using the axioms in a semantic ontology (operation 614), with the process terminating thereafter.

Figure 7:
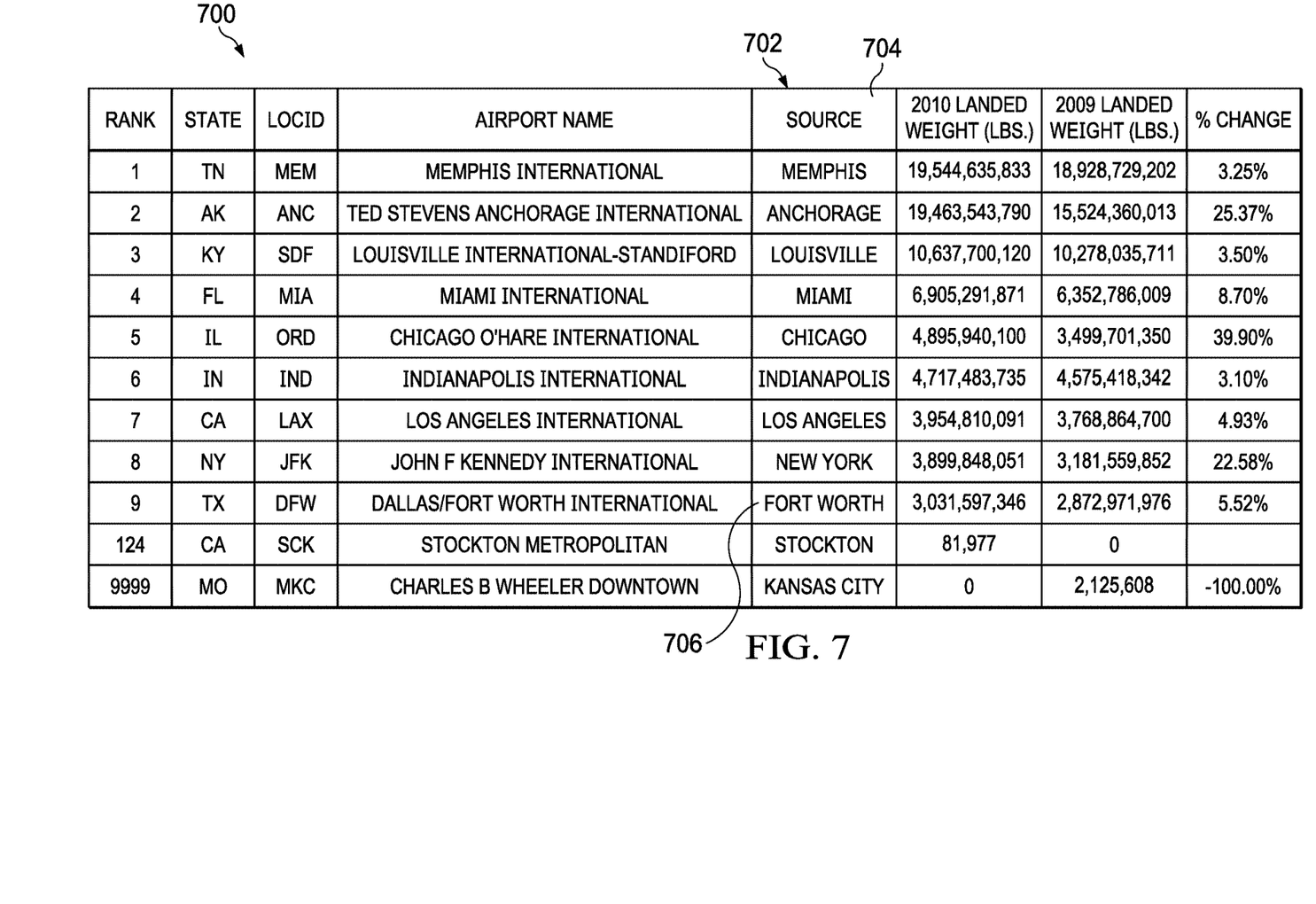
FIG. 7 is an illustration of an example of data in accordance with an illustrative embodiment.

Turning to FIG. 7, an illustration of an example of data is depicted in accordance with an illustrative embodiment. Data 700 is an example of data 210 in enterprise system 200 in FIG. 2.

Data 700 is an example data set that contains information about cargo landed in various airports. Columns in data 700 may correspond to different data items. For example, data item 702 includes data item label 704 "Source" and data values 706 of various city names.

Figure 8:
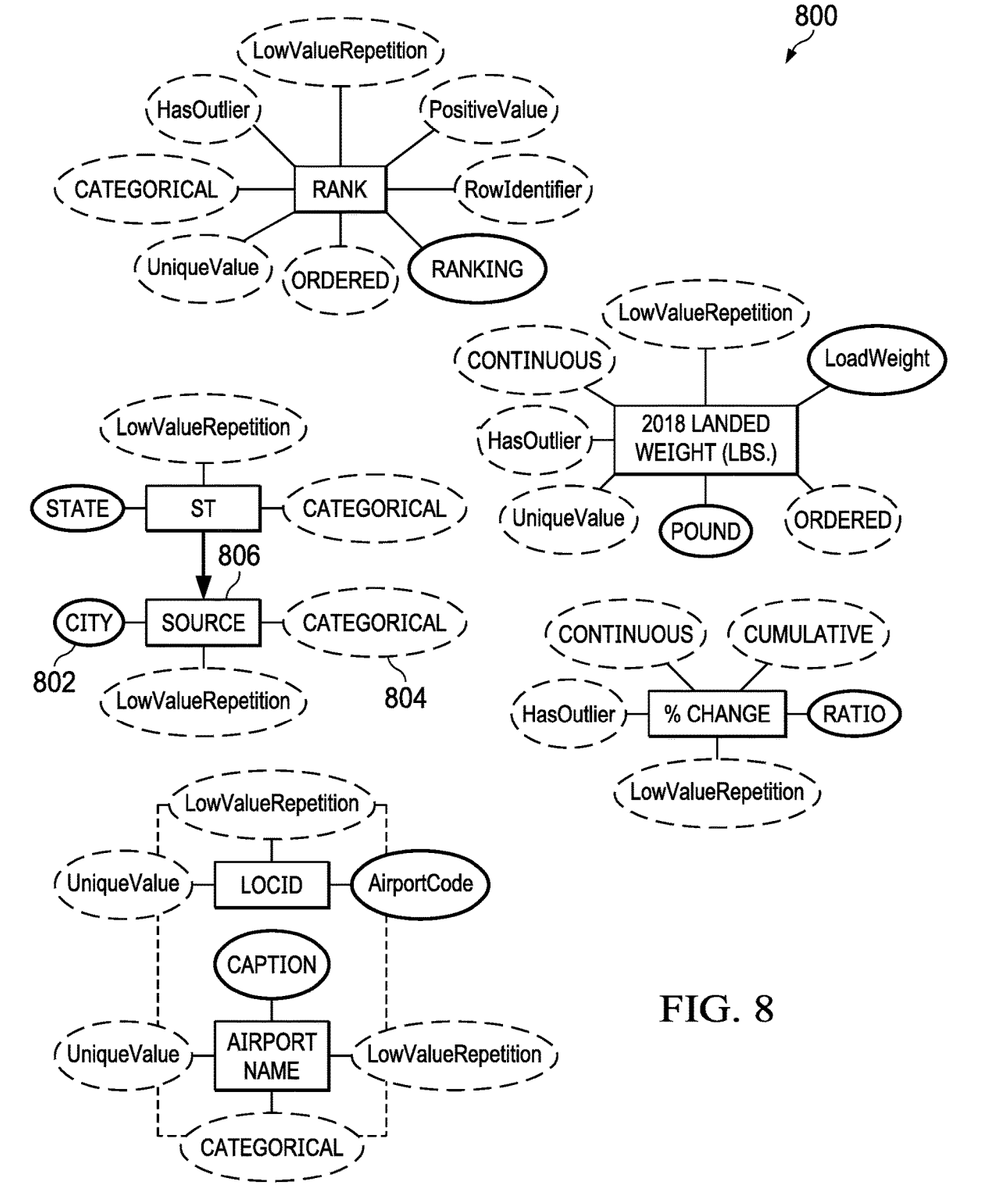
FIG. 8 is an illustration of a semantic model of data in accordance with an illustrative embodiment.

Turning to FIG. 8, an illustration of a semantic model of data is depicted in accordance with an illustrative embodiment. Semantic model 800 is an example of a semantic model of data 700 in FIG. 7 generated in accordance with an illustrative embodiment.

In semantic model 800, various domain-dependent semantic concepts and data concepts are identified for various data items. Data items are indicated by rectangles in FIG. 8. Domain-dependent semantic concepts are indicated by solid ovals in FIG. 8. Data concepts are indicated by dashed ovals in FIG. 8. For example, semantic concept "City" 802 and data concept "Categorical" 804 are identified for data item "Source" 806.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 9:
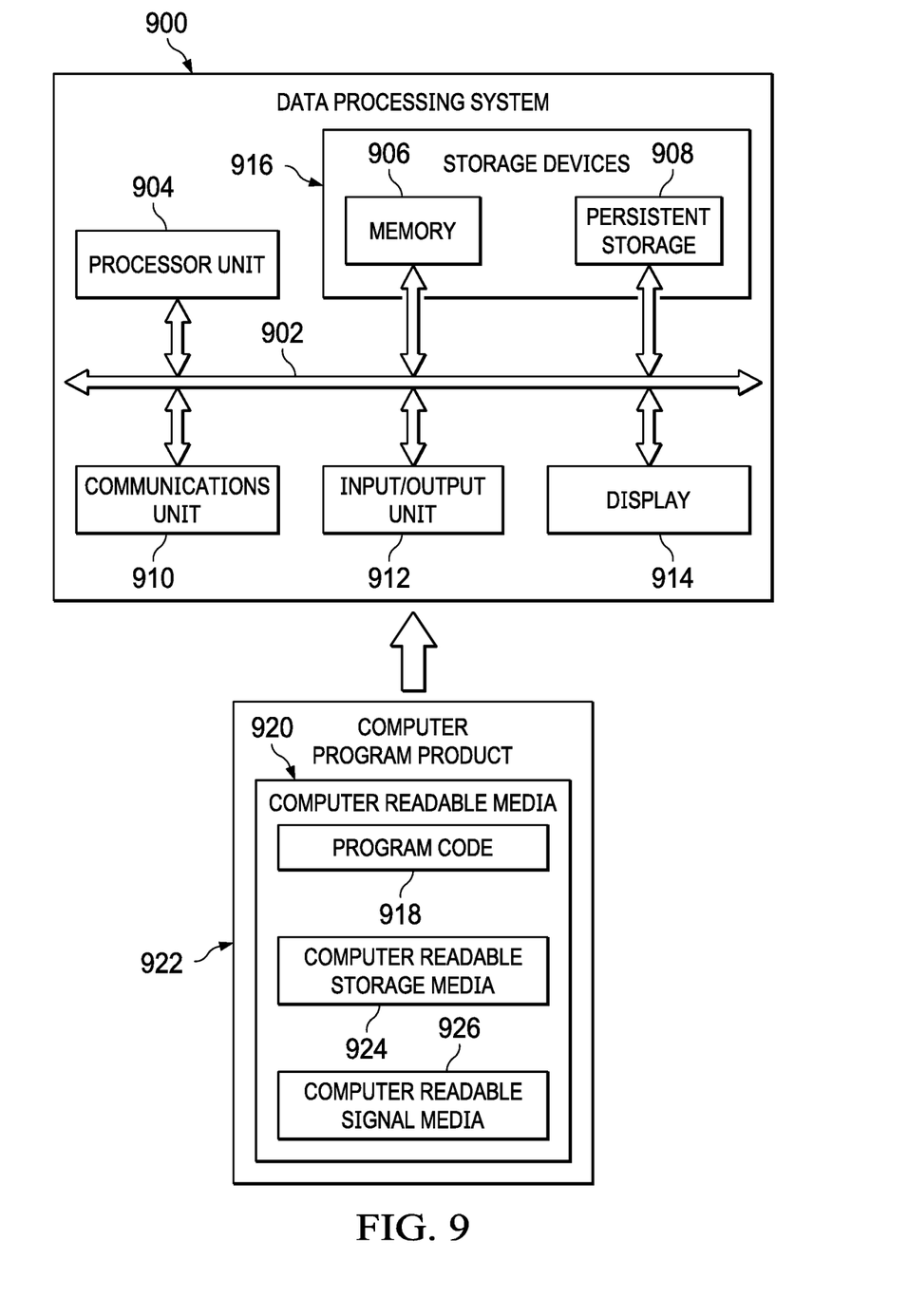
FIG. 9 is a block diagram of a data processing system in accordance with an illustrative embodiment.

Turning to FIG. 9, a block diagram of a data processing system is depicted in accordance with an illustrative embodiment. Data processing system 900 can be used to implement server computer 104, server computer 106, client computer 110, client computer 112, and client computer 114 in FIG. 1. Data processing system 900 can also be used to implement enterprise system 200 in FIG. 2. In this illustrative example, data processing system 900 includes communications framework 902, which provides communications between processor unit 904, memory 906, persistent storage 908, communications unit 910, input/output (I/O) unit 912, and display 914. In this example, communications framework 902 takes the form of a bus system.

Processor unit 904 serves to execute instructions for software that can be loaded into memory 906. Processor unit 904 includes one or more processors. For example, processor unit 904 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 904 can may be implemented using one or more heterogeneous processor systems in which a main processor is present with secondary processors on a single chip. As another illustrative example, processor unit 904 can be a symmetric multi-processor system containing multiple processors of the same type on a single chip.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, can be, for example, a random-access memory or any other suitable volatile or non-volatile storage device. Persistent storage 908 may take various forms, depending on the particular implementation.

For example, persistent storage 908 may contain one or more components or devices. For example, persistent storage 908 can be a hard drive, a solid-state drive (SSD), a flash memory, a rewritable optical disk, a rewritable magnetic tape, or some combination of the above. The media used by persistent storage 908 also can be removable. For example, a removable hard drive can be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that can be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs can be located in storage devices 916, which are in communication with processor unit 904 through communications framework 902. The processes of the different embodiments can be performed by processor unit 904 using computer-implemented instructions, which may be located in a memory, such as memory 906.

These instructions are referred to as program code, computer usable program code, or computer-readable program code that can be read and executed by a processor in processor unit 904. The program code in the different embodiments can be embodied on different physical or computer-readable storage media, such as memory 906 or persistent storage 908.

Program code 918 is located in a functional form on computer-readable media 920 that is selectively removable and can be loaded onto or transferred to data processing system 900 for execution by processor unit 904. Program code 918 and computer-readable media 920 form computer program product 922 in these illustrative examples. In the illustrative example, computer-readable media 920 is computer-readable storage media 924.

In these illustrative examples, computer-readable storage media 924 is a physical or tangible storage device used to store program code 918 rather than a medium that propagates or transmits program code 918.

Alternatively, program code 918 can be transferred to data processing system 900 using a computer-readable signal media. The computer-readable signal media can be, for example, a propagated data signal containing program code 918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 900 are not meant to provide architectural limitations to the manner in which different embodiments can be implemented. In some illustrative examples, one or more of the components may be incorporated in or otherwise form a portion of, another component. For example, memory 906, or portions thereof, may be incorporated in processor unit 904 in some illustrative examples. The different illustrative embodiments can be implemented in a data processing system including components in addition to or in place of those illustrated for data processing system 900. Other components shown in FIG. 9 can be varied from the illustrative examples shown. The different embodiments can be implemented using any hardware device or system capable of running program code 918.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method of generating a semantic model of data comprising a plurality of data items, comprising:

for each data item in the plurality of data items, identifying, by a data processing system, semantic concepts for the data item;

for each data item in the plurality of data items, identifying, by the data processing system, data concepts for the data item based on data characteristics of the data item and using a data ontology that defines the data concepts that are used to represent the data characteristics, wherein identifying data concepts for the data item comprises:

receiving data characteristic information for the data item; and evaluating, using a data concept classifier, the data characteristic information for the data item using rules defined in the data ontology to identify the data concepts that represent the data characteristics of the data item;

generating the semantic model of the data, by the data processing system, using the semantic concepts and the data concepts identified for the plurality of data items; and performing analytics of the data using the semantic model by generating a visualization of the data using an analytics application, wherein the visualization as provided on a computer display device, includes a graphical representation of the data that includes images representing relationships among the data, wherein identifying the semantic concepts for the plurality of data items and identifying the data concepts for the plurality of data items are performed in parallel;

wherein the data item comprises a data item label and data values and wherein identifying the semantic concepts for the data item comprises:

identifying first candidate semantic concepts for the data item based on lexical clues in the data item label for the data item and using a lexical clue concept index that indicates the semantic concepts corresponding to the lexical clues; and identifying second candidate semantic concepts for the data item based on data clues comprising a sample of the data values for the data item and using a data clue concept index that indicates the semantic concepts corresponding to the data clues;

wherein identifying the first candidate semantic concepts for the data item based on the lexical clues in the data item label comprises:

receiving the data item label for the data item;

analyzing the data item label using a natural language processing tool to generate additional lexical information for the data item label;

building a lexical search query using the additional lexical information for the data item label;

using the lexical search query to search the lexical clue concept index to produce a search result, wherein the lexical clue concept index comprises clue concept records that identify clues for concepts, and wherein the search result identifies clue concept records from the lexical clue concept index that match the lexical search query; and selecting a concept from the clue concept records identified in the search result as a candidate semantic concept for the data item;

wherein identifying the second candidate semantic concepts for the data item based on the data clues comprises:

generating a data search query to search the data clue concept index using the sample of the data values;

searching the data clue concept index using the data search query to generate search results; and selecting the second candidate semantic concepts for the data item from the search results.

2. The computer-implemented method of claim 1, wherein the data characteristic information for the data item is selected from a group of data characteristic information consisting of a sample of data values from the data item, statistics of the data values in the data item, a quality of the data in the data item, a pattern of the data in the data item, a format of the data in the data item, and a decoration of the data in the data item.

3. The computer-implemented method of claim 1, wherein:

the semantic concepts are domain-specific; and the data concepts are independent from any domain.

4. A data processing system for generating a semantic model of data comprising a plurality of data items, the data processing system comprising a data processor coupled to a memory, and program code loadable into the memory and executable by the data processor to perform steps of:

for each data item in the plurality of data items, identify semantic concepts for the data item;

for each data item in the plurality of data items, identify data concepts for the data item based on data characteristics of the data item and using a data ontology that defines the data concepts that are used to represent the data characteristics by:

receiving data characteristic information for the data item; and evaluating, using a data concept classifier, the data characteristic information for the data item using rules defined in the data ontology to identify the data concepts that represent the data characteristics of the data item;

generate the semantic model of the data using the semantic concepts and the data concepts identified for the plurality of data items; and perform analytics of the data using the semantic model by generating a visualization of the data using an analytics application, wherein the visualization as provided on a computer display device, includes a graphical representation of the data that includes images representing relationships among the data, wherein identify the semantic concepts and identify the data concepts are performed in parallel;

wherein the data item comprises a data item label and data values and wherein the data processing system is configured to identify the semantic concepts for the data item by:

identifying first candidate semantic concepts for the data item based on lexical clues in the data item label for the data item and using a lexical clue concept index that indicates the semantic concepts corresponding to the lexical clues; and identifying second candidate semantic concepts for the data item based on data clues comprising a sample of the data values for the data item and using a data clue concept index that indicates the semantic concepts corresponding to the data clues;

wherein the program code is further executable to identify the first candidate semantic concepts for the data item based on the lexical clues in the data item label by:

receiving the data item label for the data item;

analyzing the data item label using a natural language processing tool to generate additional lexical information for the data item label;

building a lexical search query using the additional lexical information for the data item label;

using the lexical search query to search the lexical clue concept index to produce a search result, wherein the lexical clue concept index comprises clue concept records that identify clues for concepts, and wherein the search result identifies clue concept records from the lexical clue concept index that match the lexical search query; and selecting a concept from the clue concept records identified in the search result as a first candidate semantic concept for the data item;

wherein the program code is further executable to identify the second candidate semantic concepts for the data item based on the data clues by:

generating a data search query to search the data clue concept clue index using the sample of the data values;

searching the data clue concept index using the data search query to generate search results; and selecting the second candidate semantic concepts for the data item from the search results.

5. The system of claim 4, wherein the data characteristic information for the data item is selected from a group of data characteristic information consisting of a sample of data values from the data item, statistics of the data values in the data item, a quality of data in the data item, a pattern of the data in the data item, a format of the data in the data item, and a decoration of the data in the data item.

6. The system of claim 4, wherein:

the semantic concepts are domain-specific; and the data concepts are independent from any domain.

7. A computer program product for generating a semantic model of data comprising a plurality of data items, the computer program product comprising a computer readable storage medium having program instructions embodied therewith, the program instructions executable by a device to cause the device to:

for each data item in the plurality of data items, identify semantic concepts for the data item;

for each data item in the plurality of data items, identify data concepts for the data item based on data characteristics of the data item and using a data ontology that defines the data concepts that are used to represent the data characteristics, wherein the program instructions are executable by the device to cause the device to identify the data concepts for the data item by:

receiving data characteristic information for the data item; and evaluating, using a data concept classifier, the data characteristic information for the data item using rules defined in the data ontology to identify the data concepts that represent the data characteristics of the data item;

generate the semantic model of the data using the semantic concepts and the data concepts identified for the plurality of data items; and performing analytics of the data using the semantic model by generating a visualization of the data using an analytics application, wherein the visualization as provided on a computer display device, includes a graphical representation of the data that includes images representing relationships among the data, wherein the program instructions are executable by the device to cause the device to identify the semantic concepts for the plurality of data items and identify the data concepts for the plurality of data items in parallel;

wherein the data item comprises a data item label and data values and wherein the program instructions are executable by the device to cause the device to identify the semantic concepts for the data item by:

identifying first candidate semantic concepts for the data item based on lexical clues in the data item label for the data item and using a lexical clue concept index that indicates the semantic concepts corresponding to the lexical clues; and identifying second candidate semantic concepts for the data item based on data clues comprising a sample of the data values for the data item and using a data clue concept index that indicates the semantic concepts corresponding to the data clues;

wherein the program instructions are executable by the device to cause the device to identify the first candidate semantic concepts for the data item based on the lexical clues in the data item label by:

receiving the data item label for the data item;

analyzing the data item label using a natural language processing tool to generate additional lexical information for the data item label;

building a lexical search query using the additional lexical information for the data item label;

using the lexical search query to search the lexical clue concept index to produce a search result, wherein the lexical clue concept index comprises clue concept records that identify clues for concepts, and wherein the search result identifies clue concept records from the lexical clue concept index that match the lexical search query; and selecting a concept from the clue concept records identified in the search result as a first candidate semantic concept for the data item;

wherein the program instructions are executable by the device to cause the device to identify the second candidate semantic concepts for the data item based on the data clues by:

generating a data search query to search the data concept clue index using the sample of the data values;

searching the data clue concept index using the data search query to generate search results; and selecting the second candidate semantic concepts for the data item from the search results.

8. The computer program product of claim 7, wherein the data characteristic information for the data item is selected from a group of data characteristic information consisting of a sample of data values from the data item, statistics of the data values in the data item, a quality of the data in the data item, a pattern of the data in the data item, a format of the data in the data item, and a decoration of the data in the data item.

9. The computer program product of claim 7, wherein:
the semantic concepts are domain-specific; and
the data concepts are independent from any domain.

* * * * *